United States Patent [19]

Kobayashi

[11] Patent Number: 4,758,900
[45] Date of Patent: Jul. 19, 1988

[54] FIELD/FRAME CONVERSION METHOD FOR MAGNETIC PICTURE RECORDING WITH DEMODULATION, INTERPOLATION AND DE-EMPHASIS AFTER CONVERSION

[75] Inventor: Yasuhito Kobayashi, Minato, Japan

[73] Assignee: Fuji Photo Film Co., Ltd., Japan

[21] Appl. No.: 885,780

[22] Filed: Jul. 15, 1986

[30] Foreign Application Priority Data

Jul. 18, 1985 [JP] Japan .................... 60-158764

[51] Int. Cl.⁴ .................................... H04N 5/93
[52] U.S. Cl. .................................. 360/11.1; 360/9.1;
358/11; 358/313
[58] Field of Search ............... 358/21 R, 32, 160, 164, 358/213.11, 310, 312, 313, 320, 335, 336, 337, 906, 909, 11, 140; 360/9.1, 10.1, 10.3, 11.1, 33.1, 35.1; 333/141

[56] References Cited

U.S. PATENT DOCUMENTS

| | | | |
|---|---|---|---|
| 3,886,589 | 5/1975 | Nasu | 360/11.1 X |
| 3,925,608 | 12/1975 | Mollet | 358/162 |
| 4,195,309 | 3/1980 | Christopher et al. | 358/329 X |
| 4,200,888 | 4/1980 | Blom | 358/162 |
| 4,298,896 | 11/1981 | Heitmann | 358/313 |
| 4,510,530 | 4/1985 | Miura et al. | 358/314 |
| 4,513,311 | 4/1985 | Hirai et al. | 358/329 X |
| 4,524,380 | 6/1985 | Shibata et al. | 358/329 X |
| 4,613,909 | 9/1986 | Tobe | 358/336 X |
| 4,626,910 | 12/1986 | Kawamura | 360/11.1 X |
| 4,641,202 | 2/1987 | Nakamura et al. | 358/313 |

Primary Examiner—Raymond F. Cardillo
Assistant Examiner—W. R. Young
Attorney, Agent, or Firm—Parkhurst & Oliff

[57] ABSTRACT

A field/frame signal conversion method in a magnetic picture recording for use in an electronic still camera and the like is disclosed which prevents the lowering of a SN ratio of a field signal and the occurrence of flicker caused by delaying the field signal. In the field/frame signal conversion method, an operation of delaying the field signal for the field/frame signal conversion as well as for an arithmetic mean operation, performed for the purpose of preventing the occurrence of the V jitter caused by the field/frame signal conversion, is carried out in the frequency modulated condition of the field signal. Then the arithmetic mean operation is performed after the field signal is frequency demodulated and before it is de-emphasized. Thus, it is possible to prevent lowering of the SN ratio of the field signal resulting from the delay operation on the field signal as well as the occurrence of flicker due to a difference in level between an undelayed filed signal and a one-half horizontal scan period delayed field signal produced when performing the field/frame signal conversion.

5 Claims, 3 Drawing Sheets

FIELD/FRAME CONVERSION METHOD FOR MAGNETIC PICTURE RECORDING WITH DEMODULATION, INTERPOLATION AND DE-EMPHASIS AFTER CONVERSION

BACKGROUND OF THE INVENTION

1. Field of the Invention

The present invention relates to a field/frame conversion method in magnetic picture recording and, more particularly, to an improved field/frame coversion method which is capable of preventing the reduction of an SN ratio and the occurrence of flicker resulting from the delayed operations of field signals.

2. Description of the Prior Art

In scanning a television screen, a system of so called interlaced scanning is used in which horizontal scanning lines are interlaced on a given number of lines, in order to be able to reduce flicker to the eyes. Generally, a specific system of interlaced scanning, in which the successive scanning lines are interlaced on every other line (2:1), is employed. In the (2:1) interlaced scanning system, a rough picture (i.e., a field) is produced in each vertical scanning and two of such rough pictures are combined to form a complete picture (i.e., a frame). A field frequency is, in the NTSC system, for example, 60 Hz, while a frame frequency is 30 Hz, 1 frame is generally expressed by 525 horizontal scanning lines. Also, odd fields and even fields are shifted in the points of initiation of horizontal scanning thereof by half the horizontal scanning period (H) or by 0.5H in relation to one another.

When video signals are to be recorded on a magnetic tape, a magnetic disc, or other various recording mediums, in general, a 1-field signal or a 1-frame signal is allocated per track. Also, in the 1-field/1-track recording, there are available two kinds of recording systems: that is, one is a so-called 1-frame/2-track recording system in which the odd and even fields are recorded successively; and, the other is a field recording system in which only either of the odd fields or the even fields are recorded. In recording, generally, at least a brightness signal Y of the video signals is pre-emphasis processed or pre-emphasized before it is frequency modulated. Now, FIG. 3 illustrates a schematic circuit diagram of a recording system in an electronic still camera employing a magnetic disc. Specifically, in FIG. 3, a brightness signal Y in a base band is passed through a pre-emphasis circuit 1 and is frequency modulated on the high frequency side thereof by a frequency modulator 2. On the other hand, two color difference signals R-Y, B-Y in the base band are selected alternately at each horizontal scanning period (1H) and line-sequentialized by a switch 4, are passed through a pre-emphasis circuit 6, and are then frequency modulated on the low frequency sides thereof by a frequency modulator 7. The resultant FM brightness signal $Y_{FM}$ and FM line sequential color difference signal $C_{FM}$ are respectively passed through amplifiers 3, 8, mixed together, and then supplied to a magnetic head 9. In FIG. 3, the numeral 5 designates a control signal for the switch 4. Also, the frequency modulation of the color difference signals R-Y, B-Y is performed using different center frequencies so as to be able to distinguish them from each other.

For reproduction in the field recording system, the strong vertical correlation of the video signals is utilized and a so called field/frame conversion system is often used in which a frame signal is created from one kind of field signals by scanning the same track twice. This field/frame conversion system aims mainly at enhancing a recording density and thus, in this system, long time recordings are possible for moving pictures while the number of frames can be increased for still pictures. However, when converting the field signal into the frame signal, the interlaced scanning cannot be realized by simply repeating one and the same field signal twice, because such simple repetition of the same field signal is not able to produce the shift of 0.5H while the interlaced scanning requires a given time relationship between the vertical synchronizing signals and the horizontal synchronizing signals and video signals in the respective lines, that is, the odd and even fields must be shifted 0.5H from each other.

Therefore, as shown in FIG. 4, the same field signal 10 reproduced by repetition is passed through a 0.5H delay line 16 after it is demodulated and de-emphasized. In other words, the field signal 10 that is fed direct without passing through the 0.5H delay line and a field signal 17 that is passed through the 0.5H delay line and thus delayed by 0.5H are selected alternately at each vertical scanning period (1 V) by an analog switch 18, so that the field signal 10 is converted into a frame signal 19. If this operation is kept on like that, then intervals between the vertical synchronizing signals will be shifted 0.5H from 1 V. To compensate this, for example, selection of contacts a, b of the analog switch 18 may be performed in a manner shown in FIG. 5. That is, only within a region 21 ranging from a front equalization section to a back equalization section out of a period to select the non-delayed field signal 10, the 0.5H delayed field signal can be selected. At any rate, in order to convert the field signal into the frame signal, as shown in FIG. 4, a circuit is used which is capable of selecting the non-delayed signal and the 0.5H delayed signal.

In FIG. 4, 11 designates a magnetic head, 12 a playback amplifier, 13 a limiter, 14 an FM demodulator, 15 a de-emphasis circuit, and 20 a control signal for the switch 18.

When the field signal in the base band is delayed in this manner, the field signal passing through a delay circuit always receives noise from the delay circuit, with the result that the SN ratio thereof is decreased 1–2 dB than that of the non-delayed field signal and the delayed signal may be attenuated by the delay circuit.

In other words, there is produced a difference between the levels of the field signal taken directly from the de-emphasis circuit 15 and the the field signal delayed through the 0.5H delay line 16, which difference gives rise to flicker on a display screen. In order to prevent the occurrences of the flicker, an amplifier may be provided after the delay line 16 to adjust the different levels. However, in this case, the level adjustment is affected after all by the temperature characteristics and secular changes of the amplifier and delay line, so that the flicker is unavoidable. Especially when the delay circuit employs a charge coupled device (CCD) delay element, due to the structure thereof, there is produced noise such as a clock pulse or the like which comes in from the outside of the circuit, and at the same time there are produced various kinds of noise due to thermal noise occurring within the charge coupled device, trap noise, or other causes, thereby reducing the SN ratio of the delayed field signal to a great extent.

Therefore, in order to prevent the occurrence of flicker caused by the reduction of the SN ratio of the field signal, it is necessary to provide an automatic gain control (AGC) circuit which permits a high accuracy of gain control to adjust the level of the field signal that has passed through the delay circuit, which results in a complicated circuit configuration in the reproduction system.

Also, when the field/frame conversion is carried out in the above-mentioned manner, a V jitter is generated in a picture reproduced on the television screen.

This V jitter means a displacement of the picture on the TV screen in the vertical direction (V direction) thereof, the displacement having a width corresponding to one horizontal scanning line (1H) to be repeated at a field period on the television picture. That is, in this case, the picture on the television screen is caused to displace in the vertical direction at each field period (1/60 sec.) as wide as 1H.

As effective means to prevent such V jitter, there is conventionally employed an operation to find the arithmetic mean of the brightness signals of the odd fields. In other words, the brightness signal delayed by 1 horizontal scan period and the undelayed or non-delayed brightness signal are added, the sum is divided by 2, and the resultant value is used as a brightness signal in the odd fields.

In this case as well, however, the SN ratio of the brightness signal is similarly lowered through the 1 horizontal scan period delay operation.

SUMMARY OF THE INVENTION

The present invention aims at eliminating the drawbacks found in the above-mentioned conventional field/frame conversion methods.

Accordingly, it is a primary object of the invention to provide an improved field/frame conversion method which employs a simple circuit configuration and is capable of preventing a lowering of an SN ratio caused by an operation of delaying a field signal.

To attain the above object, according to the invention, there is provided a method of converting a field signal into a frame signal comprising the steps of: repetitively reproducing the field signal that has been pre-emphasized, modulated, and recorded on a magnetic medium; selecting a field signal delayed by ½ horizontal scan period and an undelayed field signal alternately at each vertical scan period; and, calculating the arithmetic mean of the undelayed field signal and a field signal delayed by 1 horizontal scan period, characterized in that the above-mentioned ½ and 1 horizontal scan period delay operations on the field signal are performed in a condition where the field signal has been modulated, and also that the above-mentioned arithmetic mean calculation of the two field signals is performed after they are frequency demodulated and before they are de-emphasized.

The exact nature of this invention, as well as other objects and advantages thereof, will be readily apparent from consideration of the following specification relating to the accompanying drawings, in which like reference characters designate the same or similar parts throughout the figures thereof.

DETAILED DESCRIPTION OF A PREFERRED EMBODIMENT OF THE INVENTION

Detailed description will be given hereunder of a preferred embodiment of a field/frame conversion method in accordance with the present invention with reference to the accompanying drawings.

Figure 1:
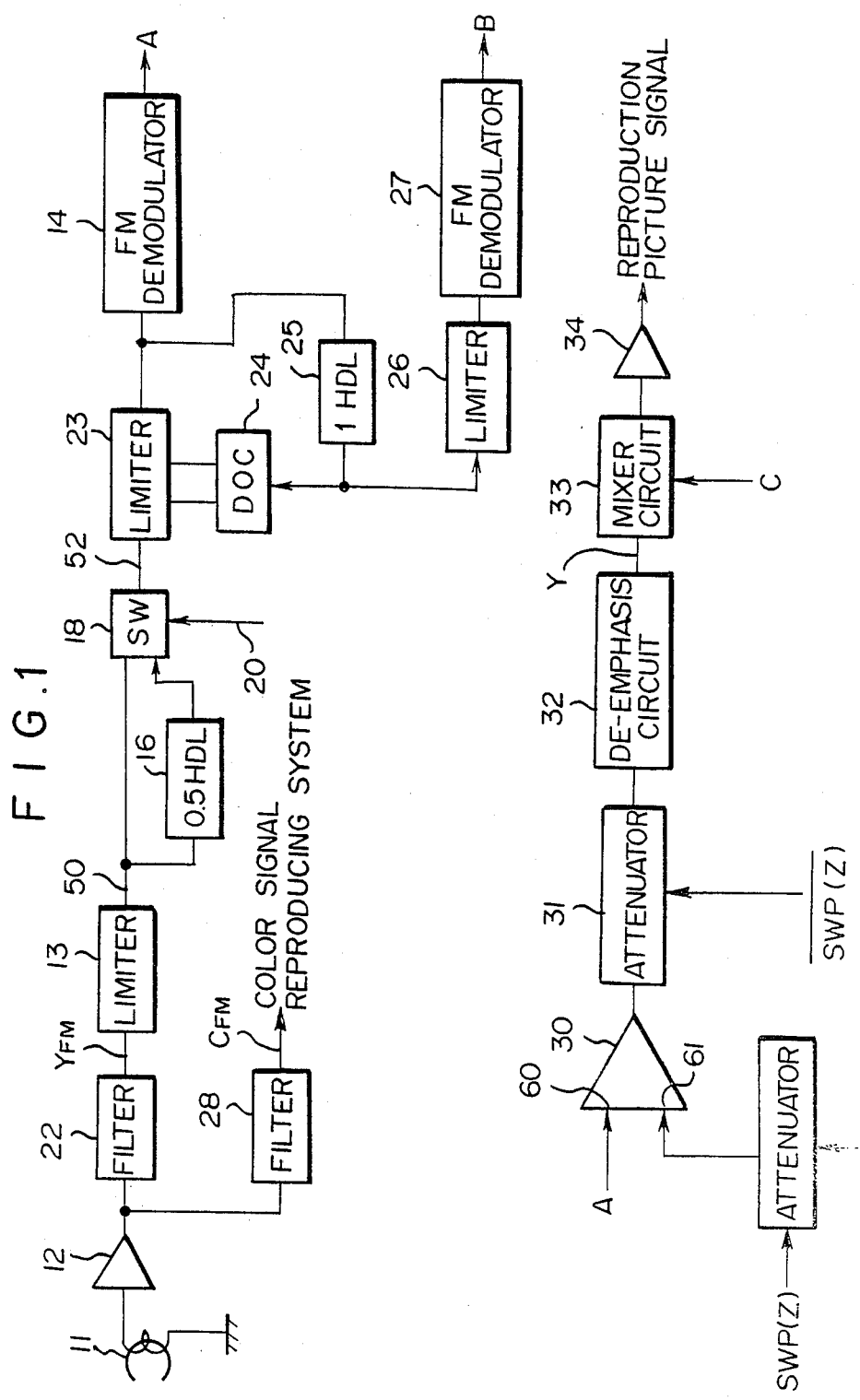
FIG. 1 is a block diagram to show a general construction of a reproducing system to which the invention is applied.
Figure 5:
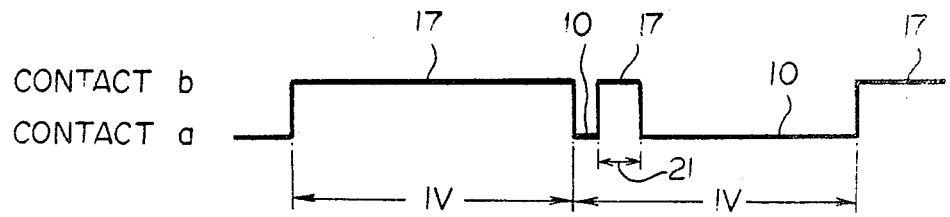

Referring now to FIG. 1, there is illustrated a general construction of a reproducing system to which the present invention is applied. In FIG. 1, a field signal repetitively reproduced from a magnetic recording medium (not shown) by a magnetic head 11 is amplified by an amplifier 12, and thereafter is divided into an FM brightness signal $Y_{FM}$ and an FM color signal $C_{FM}$ respectively by two filters 22, 28. The FM color signal $C_{FM}$ is applied to a color signal reproducing system. However, the color signal reproducing system is not directly related to the subject-matter of the invention and thus the description thereof is omitted here. Now, the FM brightness signal $Y_{FM}$ is fed to a limiter 13, where an amplitude variation portion of the FM brightness signal $Y_{FM}$ is removed from the FM brightness signal $Y_{FM}$, and after then the FM brightness signal $Y_{FM}$ is input directly or via a 0.5H delay line 16 to an analog switch 18. In the analog switch 18, an undelayed FM field signal and an FM field signal that is delayed by ½ horizontal scan period are switched alternately with each other by a control signal 20 at the timing shown in FIG. 5 and described hereinbefore for each horizontal scan period, and a field signal 50 is converted into a frame signal 52 in the frequency modulated condition thereof. This frame signal 52, after a noise component is removed therefrom by a limiter 23, is demodulated by an FM demodulator 14.

On the other hand, when drop-out is detected in the FM frame signal 52 through the limiter 23 by a drop-out compensating circuit 24, then the drop-out compensating circuit 24 supplies to the limiter 23 a frame signal that has been previously delayed by 1 horizontal scan period by a 1H delay line 25. Also, a 1 horizontal scan period delayed frame signal is input via a limiter 25 to an FM demodulator 27 and is demodulated therein.

By the way, in the illustrated embodiment, 0.5H Delay Line 16 and 1H Delay Line 25 are respectively formed of ultrasonic delay elements using special glass (so called glass delay elements). When compared with a charge coupled device (CCD) delay element, the glass delay element provides a wider frequency band for the signal to be delayed and also is easier to design for variable delay time.

Now, the above-mentioned demodulated signals from FM Demodulators 14, 27 are respectively input directly or via an attenuator 29 to an adder 30. Attenuator 29 is adapted such that the operation timing thereof is determined by a control signal SWP (Z) (it has the same timing as with the analog switch 18 shown in FIG. 5) shown in FIG. 2 (A). That is, in FIG. 2, a term $T_1$ represents a term in which the ½ horizontal scan period delayed FM field signal is selected by the analog switch 18, and a term $T_2$ is a term in which the undelayed FM field signal is selected by the analog switch 18.

Therefore, during the term $T_1$, the ½ horizontal scan period delayed FM demodulated signal is input to one 60 of the terminals of the adder 30, while the 1 horizontal scan period delayed FM demodulated signal to be input to the other terminal 61 of the adder 30 is interrupted since the attenuator 29 is in operation. On the other hand, during the term $I_2$, the undelayed FM demodulated signal is input to one terminal 60 of the adder 30, while the 1 horizontal scan period delayed FM demodulated signal is input to the other input terminal 61 of the adder 30 since the attenuator 29 is not in operation except during a term $T_3$, and these two FM demodulated signals are added.

Figure 2:
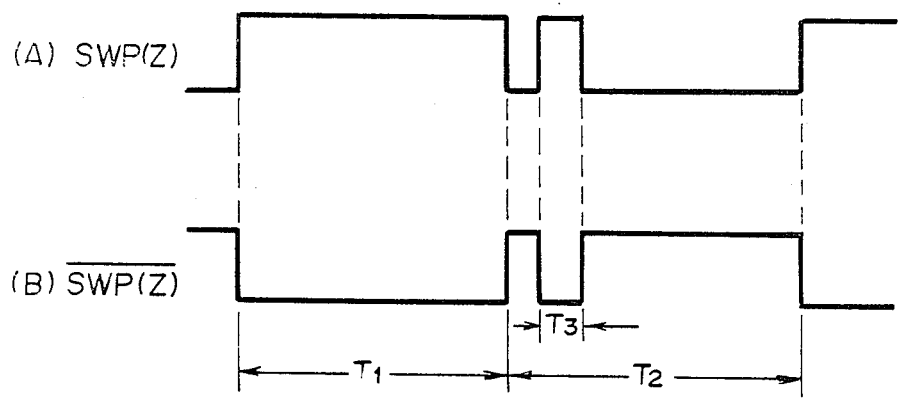
FIGS. 2(A) and (B) is a timing chart to show an example of a control signal to control the operation of an attenuator which performs an arithmetic mean operation in FIG. 1.
Figure 3:
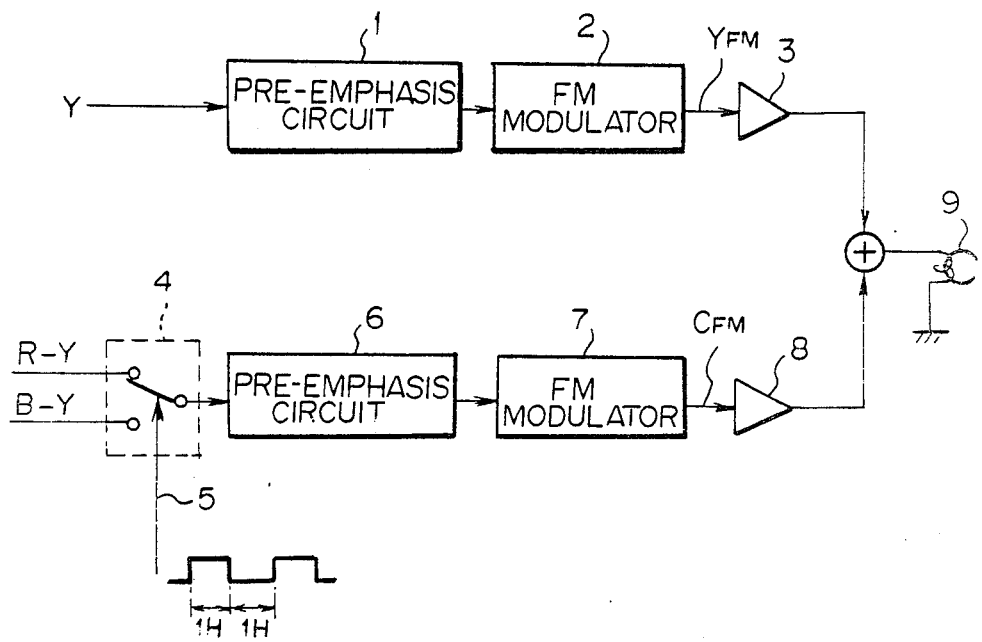
FIG. 3 is a block diagram to show a general construction of a recording system in an electronic still camera using a magnetic disc.
Figure 4:
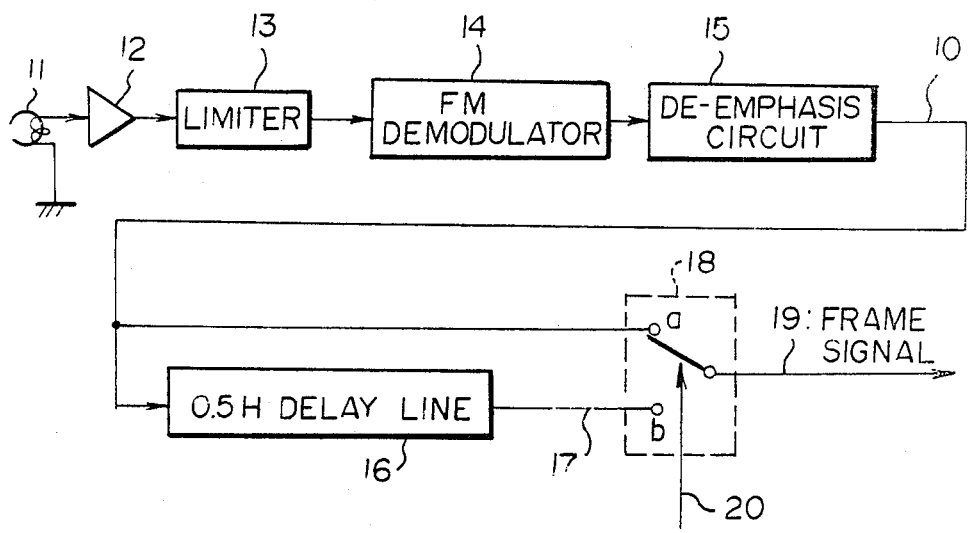
FIG. 4 is a block diagram to show a general construction of a prior art reproducing system; and, FIG. 5 is a timing chart to show the operation of a field/frame conversion switch.

Then, the added output of the adder 30 is reduced to half by an attenuator 31 which can be operated by a control signal $\overline{SWP(Z)}$ (that is, an inverted version of the signal SWP (Z)) shown in FIG. 2 (B). In other words, the arithmetic mean operation of the undelayed FM demodulated signal and the 1 horizontal scan period delayed FM demodulated signal is carried out by the adder 30 and attenuators 29, 31. This arithmetic mean operation serves to prevent the occurence of the V jitter which would otherwise be caused by the field/frame conversion operation. Next, a de-emphasis circuit 32 produces a brightness signal Y in the base band, which brightness signal Y is then mixed with a color signal C by a mixer circuit 33 and is amplified by an amplifier 34. After then the mixed and amplified signal is output as a reproducing color video signal.

As can be seen from the foregoing description, in the illustrated embodiment of the invention, since the field/frame conversion is performed in a condition where the field signal is frequency modulated, the noise that is generated from the delay circuit when the delay circuit delays the field signal can be removed by means of the above-mentioned FM demodulation and de-emphasis operations, with the result that in the base band the SN ratio of the delayed field signal becomes equal to that of the undelayed signal.

Also, in demodulation of the FM signal, due to the provision of the limiters upstream of the demodulators, the attenuation of the signal owing to the delay circuit as well as the ill effects on the signal by the temperature characteristics and secular changes of the delay circuit can be removed by the limiters, thereby preventing the occurrence of flicker. This can apply similarly to the 1 horizontal scan period delay of the FM signal which is necessary for the arithmetic mean operation.

Therefore, according to the present invention, there is eliminated the need of an automatic gain control (AGC) circuit or the like to compensate the attenuation of the field signal or the lowering of the SN ratio thereof caused by delaying the field signal, as in the aforementioned conventional brightness signal reproducing system. Also, according to the invention, since the above-mentioned arithmetic mean operation is carried out before the de-emphasis circuit, a single de-emphasis circuit can do and another de-emphasis circuit is not required. When two de-emphasis circuits are used, unless the two de-emphasis circuits are adjusted very accurately such that they are equal to each other in the de-emphasis characteristics thereof, there will be produced flicker due to the fact that the high frequency components of signals respectively output from the two de-emphasis circuits are different in level from each other. By contrast, according to the invention, only a single de-emphasis circuit will do, whereby there is eliminated the need for adjustment of the de-emphasis to prevent such flicker from being produced.

Further, the present invention provides another effect: that is, due to the fact that the arithmetic mean operation is carried out after the above-mentioned FM demodulation in a condition where the level of the signal prior to the de-emphasis operation is relatively lower, the supply voltage used may be small, with the result that the signal can be processed with ease.

As a result of the above-mentioned arithmetic mean operation, there is produced flicker in the portion of a picture reproduced on a display screen in television that has no vertical correlation. However, this problem can be solved by making Γ correction before and after the arithmetic mean operation on the brightness signal, or by varying a ratio of the levels of the undelayed field signal and the 1 horizontal scan period delayed field signal when the above-mentioned arithmetic mean operation is carried out.

As has been described hereinbefore, according to the present invention, the delay of the field signal for the field/frame conversion as well as for the arithmetic mean processing performed for the purpose of preventing the occurrence of the V jitter caused by the field/frame conversion is carried out in the frequency modulated condition thereof, and the above-mentioned arithmetic mean operation is performed after the field signal is FM demodulated and before it is de-emphasized. For this reason, the invention makes it possible to prevent the reduction of the SN ratio of the field signal resulting from the delay operation on the field signal, as well as the occurrence of flicker due to a difference in level between the undelayed field signal and the ½ horizontal scan period delayed field signal when the above-mentioned field/frame signal conversion is achieved.

It should be understood, however, that there is no intention to limit the invention to the specific forms disclosed but on the contrary the invention is to cover all modifications, alternate constructions and equivalents falling within the spirit and scope of the invention as expressed in the appended claims.

What is claimed is:

1. A method of converting a field signal into a frame signal, comprising the steps of reproducing repetitively a field signal that has been pre-emphasized, frequency modulated and recorded on a magnetic recording medium; delaying said field signal by one-half a horizontal scan period; selecting alternately said delayed field signal and an undelayed field signal at each vertical scan period and selecting said one-half horizontal scan period delayed field signal during a region ranging from a front equalization pulse section to a back equalization pulse section within a vertical scan period for selecting said undelayed field signal to thereby convert said field signal into a frame signal; delaying said frame signal by one horizontal scan period; demodulating said frame and said delayed frame signal; performing an arithmetic mean operation on said demodulated frame signal to obtain a combined frame signal; and de-emphasizing said combined frame signal.

2. A method of converting a field signal into a frame signal as set forth in claim 1, wherein performing said arithmetic mean operation includes the steps of: attenuating said delayed frame signal during a term of selection of said one-half horizontal scan period delayed field signal and not during a term of selection of said undelayed field signal; adding said attenuated delayed frame signal to said frame signal to obtain a summed frame signal; and attenuating said summed frame signal during time periods different from said step of attenuating said delayed frame signal, to obtain said combined frame signal.

3. A method of converting a field signal into a frame signal as set forth in claim 1, wherein said field signal is a brightness signal.

4. A method of converting a field signal into a frame signal as set forth in claim 1, wherein said steps of of delaying said field signals by one-half and one horizontal scan periods are carried out ultrasonically.

5. A method of converting a field signal into a frame signal as set forth in claim 1, wherein said magnetic recording medium is a magnetic disc.

* * * * *